(12) United States Patent
Cis et al.

(10) Patent No.: US 10,882,067 B2
(45) Date of Patent: Jan. 5, 2021

(54) NOZZLE ASSEMBLY

(71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 240 days.

(21) Appl. No.: 15/928,132

(22) Filed: Mar. 22, 2018

(65) Prior Publication Data
US 2018/0326431 A1   Nov. 15, 2018

(30) Foreign Application Priority Data

May 12, 2017 (EP) .................................... 17461532

(51) Int. Cl.
*B05B 15/65* (2018.01)
*F15B 13/043* (2006.01)
*F16K 31/04* (2006.01)

(52) U.S. Cl.
CPC .......... *B05B 15/65* (2018.02); *F15B 13/0438* (2013.01); *F16K 31/04* (2013.01)

(58) Field of Classification Search
CPC ....... B05B 1/00; B05B 15/65; F15B 13/0438; F16K 31/04
USPC ................................ 239/397.5, 600; 222/523
See application file for complete search history.

(56) References Cited

U.S. PATENT DOCUMENTS

| 2,832,365 | A | | 4/1958 | Smith | |
|---|---|---|---|---|---|
| 3,771,730 | A | * | 11/1973 | Nicoloff | B05B 9/01 239/536 |
| 4,050,633 | A | * | 9/1977 | Courson | B21B 45/0233 239/550 |
| 4,355,764 | A | * | 10/1982 | Rood | B05B 5/035 239/600 |

(Continued)

FOREIGN PATENT DOCUMENTS

WO    9319313 A2    9/1993

OTHER PUBLICATIONS

Extended European Search Report for International Application No. 17461532.8 dated Nov. 27, 2017, 5 pages.

*Primary Examiner* — Cody J Lieuwen
(74) *Attorney, Agent, or Firm* — Cantor Colburn LLP

(57) ABSTRACT

The present disclosure relates to a nozzle assembly for use in a servo valve. The nozzle assembly comprises three nozzle parts and a housing. The second part is coaxial with the first part and surrounds at least a first portion of the first part. The third part is coaxial with the first part, and a first portion of the third nozzle part surrounds a first portion of the second nozzle part, and a second portion of the third part is attached to a second portion of the first part. First and second nozzle parts are made of materials having approximately the same first coefficient of thermal expansion ($TE_1$), and third part and housing are made of materials having approximately the same second coefficient of thermal expansion ($TE_2$). $TE_1$ is different from $TE_2$. The interaction between the portions due to the differences in $TE_1$ and $TE_2$ allow the nozzle assembly to compensate for temperature fluctuations during and operation whilst remaining firmly held in position.

14 Claims, 3 Drawing Sheets

(56) References Cited

U.S. PATENT DOCUMENTS

| | | | | |
|---|---|---|---|---|
| 4,898,329 | A | * | 2/1990 | Davis ................. F23R 3/283 239/13 |
| 4,955,194 | A | | 9/1990 | Christensen et al. |
| 6,056,155 | A | * | 5/2000 | Byerly ................ B05C 5/0225 222/1 |
| 6,164,954 | A | | 12/2000 | Mortazavi |
| 6,334,576 | B1 | * | 1/2002 | Cho .................. F02M 51/0671 239/5 |
| 6,834,667 | B2 | * | 12/2004 | Sumiya ............. F02M 51/0671 137/15.18 |
| 2006/0113407 | A1 | * | 6/2006 | Ciccone ............... B29C 45/278 239/583 |
| 2007/0241207 | A1 | * | 10/2007 | Enrietti .............. B29C 45/1782 239/135 |
| 2018/0221909 | A1 | * | 8/2018 | Tudor ................ B05B 13/0431 |

* cited by examiner

NOZZLE ASSEMBLY

FOREIGN PRIORITY

This application claims priority to European Patent Application No. 17461532.8 filed May 12, 2017, the entire contents of which is incorporated herein by reference.

TECHNICAL FIELD

This disclosure relates to a nozzle assembly, and more specifically, but not exclusively, to a nozzle assembly in a servo valve.

This disclosure also relates to a nozzle, a method of assembling the nozzle and a method of assembling the nozzle assembly.

BACKGROUND

Servo valves are well-known in the art and can be used to control how much fluid is ported to an actuator. Typically, a flapper is deflected by an armature connected to an electric motor away or towards nozzles, which inject the fluid. Deflection of the flapper can control the amount of fluid injected from the nozzles, and thus the amount of fluid communicated to the actuator. In this way, servo valves can allow precise control of actuator movement.

In current designs, the nozzles are interference fitted into a nozzle housing. The nozzles and the housing are typically made of different materials. The nozzles may encounter wide ranging temperature changes during operation and due to differences in thermal expansion between the materials, the interference fit of the nozzle into the housing has to be very tight to ensure that it remains in the correct position within the housing at all operating temperatures. This requires very high manufacturing tolerances, which makes the nozzles expensive to produce. In addition, the tight interference fit may also make it difficult to calibrate the nozzle, as it may makes it difficult to move the nozzle axially within the housing. It may also result in over-stressing of the nozzle housing due to the high initial level of interference

SUMMARY

Disclosed herein is a nozzle assembly. The nozzle assembly comprising a nozzle housing and a nozzle. The nozzle comprises a first nozzle part, a second nozzle part, and a third nozzle part. The first nozzle part defines a central nozzle axis and has a fluid outlet at a first end and a fluid inlet at an opposed, second end. The second nozzle part is coaxial with the first nozzle part and surrounds at least a first portion of the first nozzle part. The third nozzle part is coaxial with the first part. A first portion of the third nozzle part surrounds a first portion of the second nozzle part, and a second portion of the third nozzle part is attached to a second portion of the first nozzle part. The first portion of the first nozzle part is interference fitted within the second nozzle part. The first portion of the third nozzle part is interference fitted with the first portion of the second nozzle part. A second portion of the second nozzle part is received with an interference fit within the housing. The first nozzle part and third nozzle part are made of materials having approximately the same first coefficient of thermal expansion. The nozzle housing and the second nozzle part are made of materials having approximately the same second coefficient of thermal expansion. The first coefficient of thermal expansion is different from the second coefficient of thermal expansion.

In an embodiment of the above nozzle assembly, the first coefficient of thermal expansion is less than the second coefficient of thermal expansion. In an alternative embodiment, the first coefficient of thermal expansion is greater than the second coefficient of thermal expansion.

In a further embodiment of any of the above nozzle assemblies, the first and third nozzle parts are made of the same material, and the nozzle housing and the second nozzle part are made of the same material.

In a further embodiment of any of the above nozzle assemblies, the first and third nozzle parts are made of steel, and the nozzle housing and the second nozzle part are made of aluminium.

In a further embodiment of any of the above nozzle assemblies, the first nozzle part has a threaded portion at the second end for removably securing a calibration tool to the first nozzle part.

In a further embodiment of any of the above nozzle assemblies, the first nozzle part projects axially beyond the third nozzle part, the threaded portion being formed on the projecting portion of the first nozzle part.

In a further embodiment of any of the above nozzle assemblies, the second portion of the third nozzle part is fixedly attached to the second portion of the first nozzle part, for example, by a weld. In an alternative embodiment, the third nozzle part is formed integrally with the first nozzle part.

In a further embodiment of any of the above nozzle assemblies, the first portion of the second nozzle part has a smaller diameter than the second portion of the second nozzle part.

In a further embodiment of any of the above nozzle assemblies, the outer diameter of the second portion of the second nozzle part is greater than the outer diameter of the first portion of the third nozzle part such that the third nozzle part does not project radially beyond the second portion of the second nozzle part.

In a further embodiment of any of the above nozzle assemblies, the second portion of the second nozzle part is arranged at the first end of the first nozzle part.

Also disclosed herein is a nozzle. The nozzle comprises a first nozzle part, a second nozzle part, and a third nozzle part. The first nozzle part defines a central nozzle axis and has a fluid outlet at one end and a fluid inlet at an opposed, second end. The second nozzle part is coaxial with the first nozzle part and surrounds at least a first portion of the first nozzle part. The third nozzle part is coaxial with the first part. The first portion of the third nozzle part surrounds a first portion the second nozzle part, and a second portion of the third nozzle part is attached to a second portion of the first nozzle part. The first portion of the first nozzle part is interference fitted within the second nozzle part. The first portion of the third nozzle part is interference fitted with the first portion of the second nozzle part. The first nozzle part and third nozzle part are made of materials having approximately the same first coefficient of thermal expansion. The second nozzle part is made of a material having a second coefficient of thermal expansion. The first coefficient of thermal expansion is different from the second coefficient of thermal expansion.

In further embodiments of the above nozzle, the nozzle has any combination of features recited in relation to the nozzle of the nozzle assembly embodiments described above.

Also disclosed herein is a method of assembling any of the aforementioned nozzles. The method comprises the steps of: interference fitting the first portion of the first nozzle part within the second nozzle part; machining the first portion of the second nozzle part; interference fitting the first portion of the third nozzle part over the first portion of the second nozzle part; and attaching the second portion of the third nozzle part to the second portion of the first nozzle part.

In an embodiment of the above method, the method further comprises the step of machining the outer diameter of the second nozzle part after interference fitting the first portion of the third nozzle part over the first portion of the second nozzle part.

In a further embodiment of any of the above methods, the interference fit is provided by at least one of press fitting or heat shrinking.

In a further embodiment of any of the above methods, the step of attaching the second portion of the third nozzle part to the second portion of the first part comprises welding.

Also disclosed herein is a method of assembling any of the aforementioned nozzle assemblies. The method comprises the steps of: assembling the nozzle by any of the above methods; and interference fitting the second portion of the second nozzle part into the nozzle housing.

Also disclosed herein, in broad terms, is a nozzle assembly comprising a nozzle housing and a nozzle. The nozzle comprises a first nozzle part, a second nozzle part, and a third nozzle part. The first nozzle part defines a central nozzle axis and has a fluid outlet at a first end and a fluid inlet at an opposed, second end. A first portion of the first nozzle part is interference fitted within the second nozzle part. A first portion of the third nozzle part is interference fitted with a first portion of the second nozzle part. A second portion of the second nozzle part is received with an interference fit within the housing. The three nozzle parts are configured such that the retention force of the interference fit between the first nozzle part and the second nozzle part increases in response to temperature changes in a first direction, and such that the retention force of the interference fit between the second nozzle part and the third nozzle part increases in response to temperature changes in a second direction.

BRIEF DESCRIPTION OF DRAWINGS

Some exemplary embodiments of the present disclosure will now be described by way of example only, and with reference to the following drawings in which.

DETAILED DESCRIPTION

Figure 1:
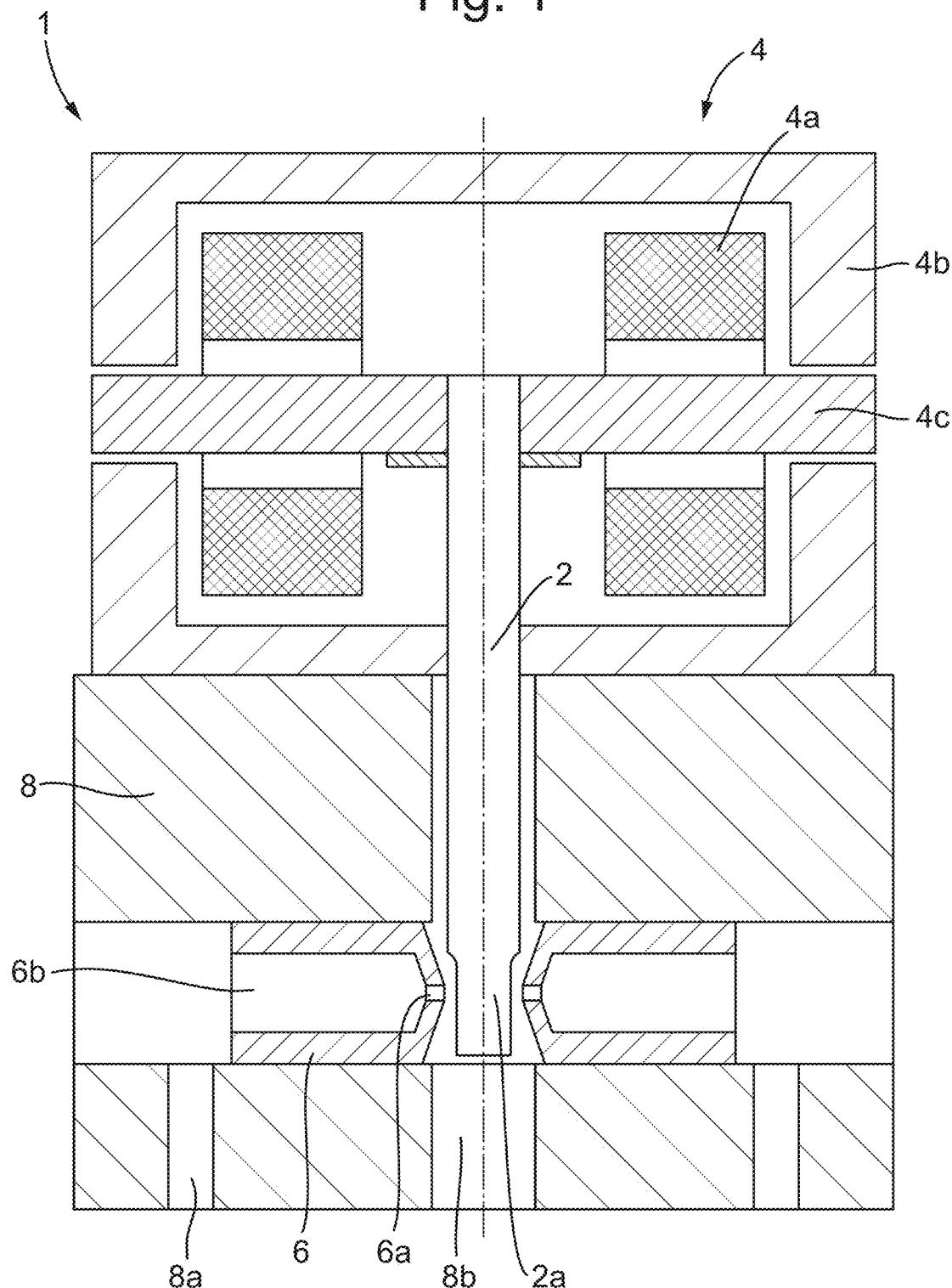
FIG. 1 shows an example of a prior art servo valve.

With reference to FIG. 1, a servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6. The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator (not shown). As is known in the art, the electric motor 4 is used to control deflection of the blocking element 2a and vary the fluid delivered to the actuator from nozzles 6 as required.

Figure 2:
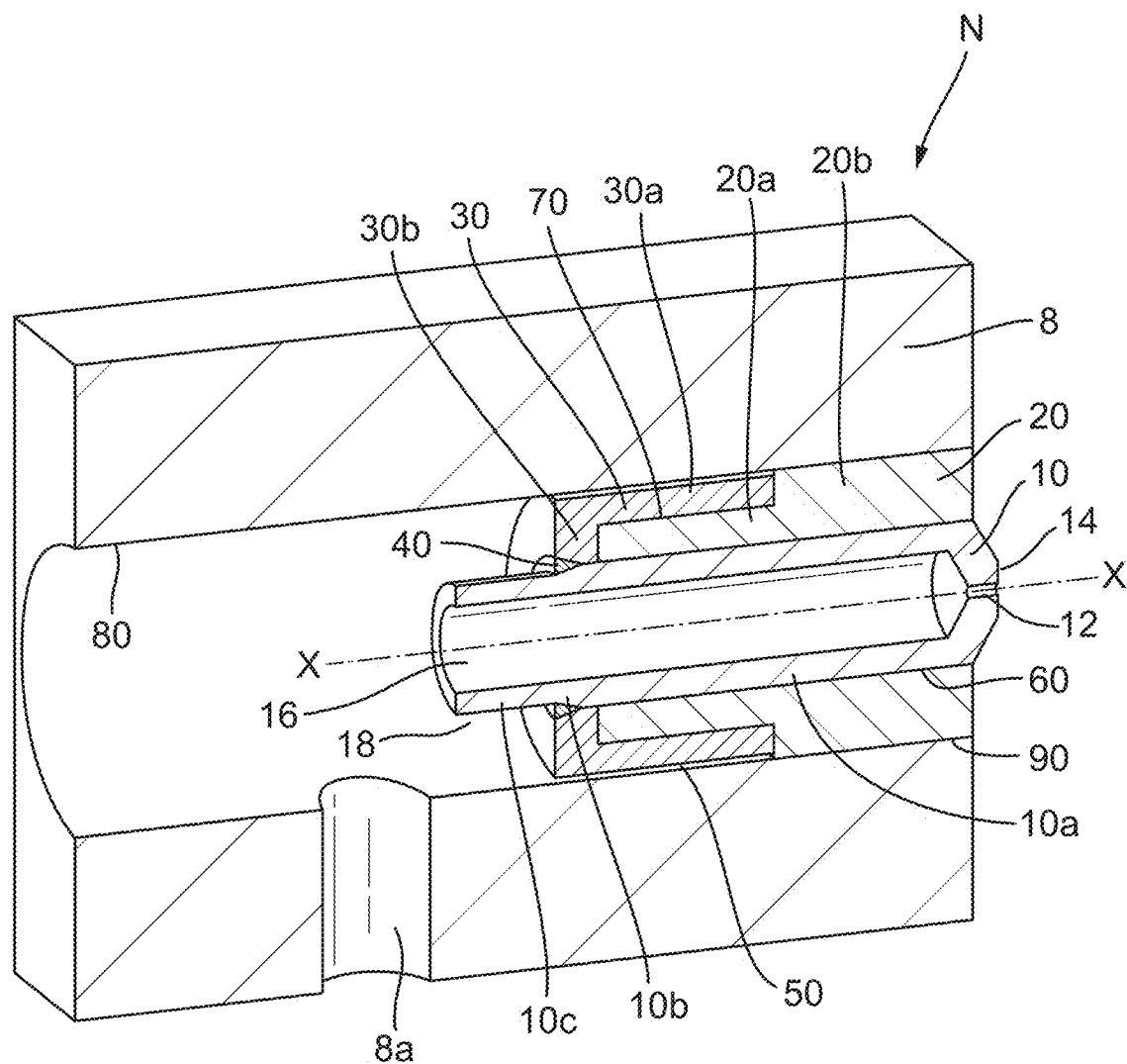
FIG. 2 shows a cross-sectional view of an embodiment of a nozzle assembly in accordance with this disclosure.

With reference to FIG. 2, a nozzle assembly N is illustrated for use in the servo valve of FIG. 1. The nozzle assembly comprises a first nozzle part 10, a second nozzle part 20 and a third nozzle part 30.

The first nozzle part 10 defines a central nozzle axis X-X and has a fluid outlet 12 at one end 14 and a fluid inlet 16 at an opposed second end 18.

The second nozzle part 20 is coaxial with the first nozzle part 10 and surrounds at least a first portion 10a of the first nozzle part 10.

The third nozzle part 30 is coaxial with the first nozzle part 10, and the second nozzle part 20. A first portion 30a of the third nozzle part 30 surrounds a first portion 20a of the second nozzle part 20, and a second portion 30b of the third nozzle part 30 is attached to a second portion 10b of the first nozzle part 10 by a weld 40, for example a laser weld. Although second portion 30b of the third nozzle part 30 is depicted as being attached to the second portion 10b of the first nozzle part 10 by welding, any other suitable method may be used, such as brazing. Alternatively, the third nozzle part 30 may be integrally formed with first nozzle part 10.

The first portion 10a of the first nozzle part 10 is interference fitted within the second nozzle part 20 along a first interface 60. The first portion 30a of the third nozzle part 30 is interference fitted with the first portion 20a of the second nozzle part 20 along a second interface 70. The second interface 70 is radially outwardly of the first interface 60 and axially overlaps a rearward portion thereof. The second portion 20b of the second nozzle part 20 is received with an interference fit within a bore 80 of the nozzle housing 8 along a third interface 90. The third interface 90 is radially outward of the first and second interfaces 60, 70 and axially overlaps a forward portion of the first interface 60.

The interference fitting may be achieved by any suitable method known in the art, for instance, by press fitting and/or heat shrinking.

In the depicted embodiment, the first portion 20a of the second nozzle part 20 has a smaller outer diameter than that of the second portion 20b of the second nozzle part 20. This forms a shoulder which accommodates the first portion 30a of the third nozzle part 30.

The second portion 20b of the second nozzle part 20 is arranged at the fluid outlet end 14 of the first nozzle part 10. The outer diameter of second portion 20b is greater than the outer diameter of the first portion 30a of the third nozzle part 30, such that the third nozzle part 30 does not project radially outwardly beyond the second portion 20b of the second nozzle part 20. A gap 50 is therefore formed between the first portion 30a of the third nozzle part 30 and the housing 8, so that the third nozzle part 30 does not engage or interfere with the housing 8.

The first and third nozzle parts 10, 30 are made of materials having approximately the same first coefficient of thermal expansion $TE_1$. The second nozzle part 20 and the housing 8 are made of materials having approximately the same second coefficient of thermal expansion $TE_2$. $TE_1$ is different from $TE_2$. In one particular embodiment, $TE_1$ is less than $TE_2$. In an alternative embodiment, $TE_1$ is greater than $TE_2$.

The first and third nozzle parts 10, 30 may be made of different materials with approximately the same $TE_1$ or may be made of the same material. Similarly, the second nozzle part 20 and the housing 8 may be made of different materials with approximately the same $TE_2$ or may be made of the same material, which is different from that of the first and third nozzle parts 10, 30. Any suitable materials may be used, as would be known to the skilled person. In one particular embodiment, where $TE_1$ is less than $TE_2$, first and third nozzle parts 10, 30 are made of steel and the housing 8 and second nozzle part 20 are made of aluminium or any alloy thereof. In one particular alternative embodiment, where $TE_1$ is greater than $TE_2$, first and third nozzle parts 10, 30 are made of steel and the housing 8 and second nozzle part 20 are made of titanium or an alloy thereof.

The difference in the coefficients of thermal expansion of the various nozzle parts 10, 20, 30 and the nozzle housing 8 will compensate for thermal expansion and contraction of the nozzle assembly in terms of the contact forces occurring at the first, second and third interfaces 60, 70, 90.

In embodiments where $TE_1$ is less than $TE_2$, as the temperature of the nozzle assembly increases from ambient, the second nozzle part 20 and housing 8 will expand more than first and third nozzle parts 10, 30. Therefore the fit between the first portion 10a of the first nozzle part 10 and the second nozzle part 20 at the first interface 60 will become looser. However, the fit between first portion 20a of the second nozzle part 20 and the first portion 30a of the third nozzle part 30 at the second interface 70 will become tighter. Since the housing 8 and second nozzle part 20 have approximately the same $TE_2$, the fit between the second portion 20b of the second nozzle part 20 and the housing 8 at third interface 90 remains approximately constant. Thus, while the force transfer capability at the first interface 60 has reduced, the force transfer capability at the second interface 70 increases. This therefore compensates for the effects of increased temperature.

When the temperature of the nozzle assembly decreases from ambient, the second nozzle part 20 and housing 8 will contract more than first and third nozzle parts 10, 30. Therefore the fit between the first portion 10a of the first nozzle part 10 and the second part 20 at the first interface 60 becomes tighter, and the fit between first portion 20a of the second nozzle part 20 and first portion 30a of the third nozzle part 30 at the second interface 70 becomes looser. The fit between second portion 20b of the second nozzle part 20 and the housing 8 at third interface 90 likewise remains the same. Thus, while the force transfer capability at the second interface 70 has reduced, the force transfer capability at the first interface 60 increases. This therefore compensates for the effects of decreasing temperature.

In embodiments where $TE_1$ is greater than $TE_2$, the fit at first and second interfaces 60 and 70 are changed in the opposite manner during heating and cooling from ambient temperatures. For instance, when the temperature of the nozzle assembly increases from ambient, the second nozzle part 20 and housing 8 will expand less than first and third nozzle parts 10, 30. Therefore the fit between the first portion 10a of the first nozzle part 10 and the second nozzle part 20 at the first interface 60 will become tighter. However, the fit between first portion 20a of the second nozzle part 20 and the first portion 30a of the third nozzle part 30 at the second interface 70 will become looser. Thus, as the force transfer capability at the first interface 60 increases, the force transfer capability at the second interface 70 decreases.

When the temperature of the nozzle assembly decreases from ambient, the second nozzle part 20 and housing 8 will contract less than first and third nozzle parts 10, 30. Therefore the fit between the first portion 10a of the first nozzle part 10 and the second nozzle part 20 at the first interface 60 will become looser. However, the fit between first portion 20a of the second nozzle part 20 and the first portion 30a of the third nozzle part 30 at the second interface 70 will become tighter. Thus, as the force transfer capability at the first interface 60 decreases, the force transfer capability at the second interface 70 increases.

The aforementioned interactions between the first, second and third nozzle parts 10, 20, 30 and the nozzle housing 8 at the first, second and third interfaces 60, 70, 90 due to the differences in $TE_1$ and $TE_2$ allows the first nozzle part 10 to be firmly held in position in the housing 8 during a range of operating temperatures.

When at room temperature, the fit between first portion 10a of the first nozzle part 10 and the second nozzle part 20 at the first interface 60 is loose enough to allow axial movement of the first nozzle part 10 relative to second nozzle part 20 under the application of a predetermined axial calibration force, but is tight enough to prevent its unintended movement. The fit between first portion 20a of the second nozzle part 20 and the first portion 30a of the third nozzle part 30 at second interface 70 is sufficient to prevent unwanted movement between second and third nozzle parts 20, 30 in the same manner as that between first portion 10a of the first nozzle part 10 and the second part 20 at first interface 60, whilst the fit between second portion 20b of the second nozzle part 20 and the housing 8 at third interface 90 is tighter, to hold the second part 20 firmly in place within the housing 8 with greater resistance to movement. In this manner, frictional resistance at interface 90 is higher than the sum of frictional resistance at interfaces 60 and 70.

Alternatively, the fit between the second portion 20b of the second nozzle part 20 and the housing 8 at third interface 90 is the same as that at the first interface 60 above, which allows first, second and third nozzles parts 10, 20 and 30 to move together axially relative to housing 8 under the application of a predetermined axial calibration force. In this manner, frictional resistance at interface 90 is lower than sum of frictional resistances at interfaces 60 and 70.

These fits allow the nozzle to be more easily moved axially along X-X to vary the distance from the fluid outlet 12 to the flapper blocking element 2a, which can be used to calibrate the nozzle. It may also allow lower stresses on the housing 8 than in conventional designs as the initial degree of interference between the nozzle and the housing 8 need not be as high due to the thermal compensation effects discussed above.

To facilitate calibration, the first nozzle part 10 further comprises a threaded portion 10c that projects axially beyond the third nozzle part 30. This threaded portion 10c can be used to removably secure a calibration tool (not shown) to the first nozzle part 10. The calibration tool may be a rod that can be threadably secured to threaded portion 10c and allows the user to push or pull the first nozzle part 10 along the axis X-X.

Figure 3A:
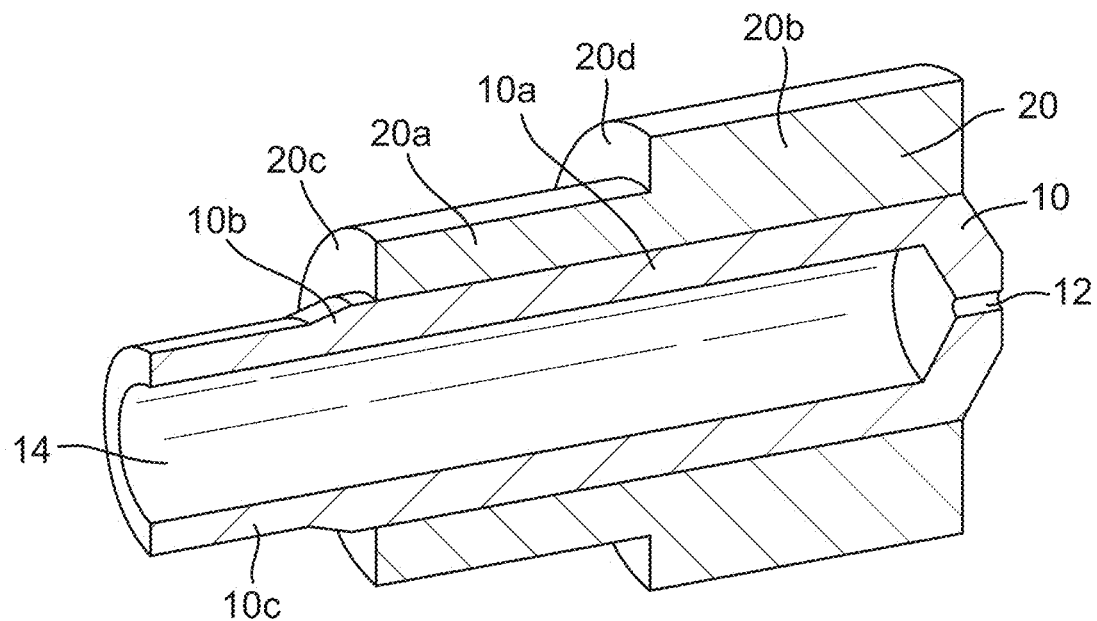
FIGS. 3a and 3b show cross-sectional views of stages of assembling a nozzle in accordance with an embodiment of this disclosure.
Figure 3B:
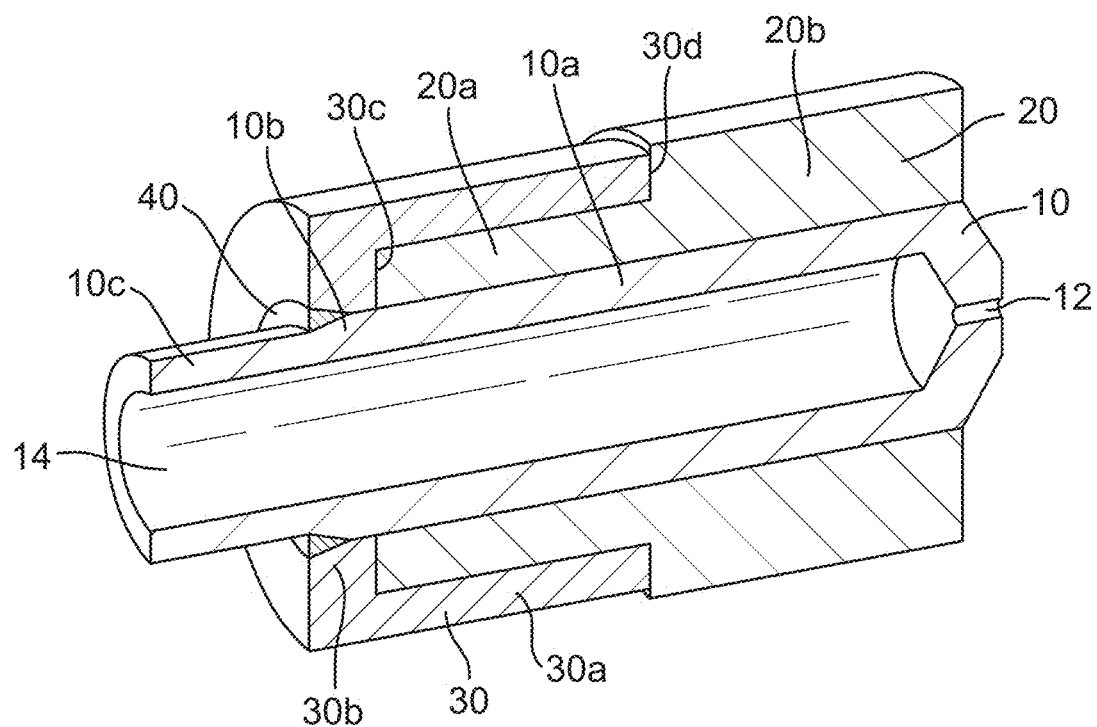

FIGS. 3a and 3b illustrate stages of assembling a nozzle assembly N as described above.

As shown in FIG. 3a, the nozzle is first assembled by interference fitting the first portion 10a of the first nozzle part 10 within the second nozzle part 20. The first portion 20a of the second nozzle part 20 may be already at least partially formed in the second part 20. In alternative embodiments, the second nozzle part 20 may initially be cylindrical. However, whichever initial state the second nozzle part 20 takes, the first portion 20a thereof is machined into the second nozzle part 20 at this stage. This post-fitting machining is advantageous as it provides an accurate dimension for the first portion 20a.

As shown in FIG. 3b, the first portion 30a of the third part 30 is then interference fitted over the first portion 20a of the second part 20. The internal diameter of the first portion 30a of the third nozzle part 30 is pre-machined to provide the desired degree of interference with the first portion 20a of the second nozzle part 20. The third nozzle part 30 may be pushed onto the first portion 20a of the second nozzle part 20 until its internal end surface 30c engages the end 20c of the second nozzle part 20 or until its end face 30d contacts the shoulder 20d of the second nozzle part 20.

The second portion 30b of the third nozzle part 30 is then attached to the second portion 10b of the first nozzle part 10 by a weld 40, for example a laser weld, which may minimise thermal distortion.

The external diameter of the second portion 20b of the second nozzle part 20 may be machined to the required diameter. This machining may instead be carried out before the attachment of the first and third nozzle parts 10, 30.

Finally, the second portion 20b is interference fitted within the bore 80 in the housing 8.

The nozzle embodiment described above may have the advantage that the tolerances between the housing 8 and second nozzle part 20 may be somewhat relaxed, leading to less expensive manufacture. The degree of finish between the various parts may not need to be as high in conventional nozzles.

Although the figures and the accompanying description describe particular embodiments and examples, it is to be understood that the scope of this disclosure is not to be limited to such specific embodiments, and is, instead, to be determined by the following claims.

The invention claimed is:

1. A nozzle assembly comprising:
a nozzle housing; and
a nozzle comprising:
a first nozzle part defining a central nozzle axis (X-X) and having a fluid outlet at a first end and a fluid inlet at an opposed, second end;
a second nozzle part coaxial with the first nozzle part and surrounding at least a first portion of the first nozzle part; and
a third nozzle part coaxial with the first part, wherein a first portion of the third nozzle part surrounds a first portion of the second nozzle part, and a second portion of the third nozzle part is attached to a second portion of the first nozzle part; wherein:
the first portion of the first nozzle part is interference fitted within the second nozzle part by press fitting or heat shrinking;
the first portion of the third nozzle part is interference fitted with the first portion of the second nozzle part by press fitting or heat shrinking;
a second portion of the second nozzle part is received with an interference fit within the housing by press fitting or heat shrinking;
the first nozzle part and third nozzle part are made of materials having the same first coefficient of thermal expansion ($TE_1$);
the nozzle housing and the second nozzle part are made of materials having the same second coefficient of thermal expansion ($TE_2$);
the first coefficient of thermal expansion ($TE_1$) is different from the second coefficient of thermal expansion ($TE_2$); and
the second portion of the third nozzle part is fixedly attached to the second portion of the first nozzle part by a weld;
wherein the second nozzle part is completely disposed within the housing.

2. The nozzle assembly of claim 1, wherein the first and third nozzle parts are made of the same material, and the nozzle housing and the second nozzle part are made of the same material.

3. The nozzle assembly of claim 1, wherein the first and third nozzle parts are made of steel, and the nozzle housing and the second nozzle part are made of aluminium.

4. The nozzle assembly of claim 1, wherein the first nozzle part has a threaded portion at the second end for removably securing a calibration tool to the first nozzle part.

5. The nozzle assembly of claim 4, wherein the first nozzle part projects axially beyond the third nozzle part, the threaded portion being formed on the projecting portion of the first nozzle part.

6. The nozzle assembly of claim 1, wherein the first portion of the second nozzle part has a smaller diameter than the second portion of the second nozzle part.

7. The nozzle assembly of claim 1, wherein the outer diameter of the second portion of the second nozzle part is greater than the outer diameter of the first portion of the third nozzle part such that the third nozzle part does not project radially beyond the second portion of the second nozzle part.

8. The nozzle assembly of claim 1, wherein the second portion of the second nozzle part is arranged at the first end of the first nozzle part.

9. The nozzle assembly of claim 1, wherein the first coefficient of thermal expansion ($TE_1$) is less than the second coefficient of thermal expansion ($TE_2$).

10. The nozzle assembly of claim 1, wherein the second nozzle part has an internal passage extending from a first end to a second end and the first nozzle part is disposed within and extends at least along the entire length of the internal passage.

11. A nozzle comprising:
a first nozzle part defining a central nozzle axis (X-X) and having a fluid outlet at one end and a fluid inlet at an opposed, second end;
a second nozzle part coaxial with the first nozzle part and surrounding at least a first portion of the first nozzle part; and
a third nozzle part coaxial with the first part, wherein a first portion of the third nozzle part surrounds a first portion the second nozzle part, and a second portion of the third nozzle part is attached to a second portion of the first nozzle part; wherein:
the first portion of the first nozzle part is interference fitted within the second nozzle part by press fitting or heat shrinking;
the first portion of the third nozzle part is interference fitted with the first portion of the second nozzle part by press fitting or heat shrinking;
the first nozzle part and third nozzle part are made of materials having the same first coefficient of thermal expansion ($TE_1$);
the second nozzle part is made of a material having a second coefficient of thermal expansion ($TE_2$);

the first coefficient of thermal expansion (TE$_1$) is different from the second coefficient of thermal expansion (TE$_2$); and the second portion of the third nozzle part is fixedly attached to the second portion of the first nozzle part by a weld;

wherein the second nozzle part has an internal passage extending from a first end to a second end and the first nozzle part is disposed within and extends at least along the entire length of the internal passage.

12. The nozzle of claim 11, wherein the first coefficient of thermal expansion (TE$_1$) is less than the second coefficient of thermal expansion (TE$_2$).

13. A method of assembling the nozzle of claim 11, the method comprising:

interference fitting the first portion of the first nozzle part within the second nozzle part by press fitting or heat shrinking;

machining the first portion of the second nozzle part;

interference fitting the first portion of the third nozzle part over the first portion of the second nozzle part by press fitting or heat shrinking; and attaching the second portion of the third nozzle part to the second portion of the first nozzle part;

wherein attaching the second portion of the third nozzle part to the second portion of the first part comprises welding.

14. The method of claim 13, further comprising machining the outer diameter of the second nozzle part after interference fitting the first portion of the third nozzle part over the first portion of the second nozzle part.

* * * * *